United States Patent
Rangappagowda et al.

(10) Patent No.: US 9,301,170 B2
(45) Date of Patent: Mar. 29, 2016

(54) SYSTEMS, METHODS, AND COMPUTER READABLE MEDIA FOR UTILIZING A MOBILE ROBOTIC PLATFORM TO CONDUCT FUNCTIONALITY TESTING IN A WIRELESS COMMUNICATIONS NETWORK

(71) Applicant: Ixia, Calabasas, CA (US)

(72) Inventors: Madhu H. Rangappagowda, Cary, NC (US); Jimmy Hardy, Apex, NC (US); Qing Liu, Cary, NC (US); Timothy Earl Bennington-Davis, Tualatin, OR (US); Dane Bennington, Pittsburgh, PA (US)

(73) Assignee: Ixia, Calabasas, CA (US)

( * ) Notice: Subject to any disclaimer, the term of this patent is extended or adjusted under 35 U.S.C. 154(b) by 0 days.

(21) Appl. No.: 14/229,791

(22) Filed: Mar. 28, 2014

(65) Prior Publication Data

US 2015/0126129 A1    May 7, 2015

Related U.S. Application Data

(60) Provisional application No. 61/900,969, filed on Nov. 6, 2013.

(51) Int. Cl.
*H04B 17/00* (2015.01)
*H04W 24/00* (2009.01)
(Continued)

(52) U.S. Cl.
CPC .............. *H04W 24/06* (2013.01); *H04W 88/08* (2013.01); *Y10S 901/01* (2013.01)

(58) Field of Classification Search
CPC . H04B 17/0087; H04B 17/309; H04W 24/00; H04W 24/04; H04W 24/045; H04W 24/06; H04W 48/20; H04W 84/005

USPC ............ 455/67.11, 67.14, 423, 424; 370/328, 370/338
See application file for complete search history.

(56) References Cited

U.S. PATENT DOCUMENTS 6,973,518 B2 * 12/2005 Purpura ........................ 710/104
7,286,802 B2 * 10/2007 Beyme et al. .............. 455/67.14
(Continued)

OTHER PUBLICATIONS

Notification of Transmittal of the International Search Report and the Written Opinion of the International Searching Authority, or the Declaration for PCT International Patent Application No. PCT/US2014/063000 (Feb. 16, 2015).
(Continued)

*Primary Examiner* — Quochien B Vuong
(74) *Attorney, Agent, or Firm* — Jenkins, Wilson, Taylor & Hunt, P.A.

(57) ABSTRACT

According to one aspect, the disclosed subject matter describes herein a system that includes a mobile robotic platform for navigating within a coverage area associated with an access point belonging to a communications network under test, wherein the mobile robotic platform includes a client device emulation module configured to emulate multiple client devices that are wirelessly connected to the access point and to send emulated test traffic data to the access point from each of the emulated client devices via a wireless connection. The mobile robotic platform also includes a real client device that includes a client application configured to communicate simulated test traffic data to the access point via an established wireless connection and a performance metrics module configured to determine wireless communication performance metrics associated with the wireless connection between the access point and at least one of the real client device or the emulated client devices.

25 Claims, 4 Drawing Sheets

(51) Int. Cl.
*H04W 24/06* (2009.01)
*H04W 88/08* (2009.01)

(56) References Cited

U.S. PATENT DOCUMENTS

| | | | |
|---|---|---|---|
| 7,349,670 B2 * | 3/2008 | Mlinarsky et al. | 455/67.11 |
| 7,702,330 B2 * | 4/2010 | Alexander et al. | 455/67.11 |
| 8,145,136 B1 * | 3/2012 | Bharghavan | 455/67.11 |
| 8,526,938 B1 * | 9/2013 | Gardner | 455/423 |
| 2009/0094492 A1 | 4/2009 | Music et al. | |
| 2011/0310745 A1 | 12/2011 | Goria et al. | |
| 2012/0051224 A1 | 3/2012 | Olgaard et al. | |

OTHER PUBLICATIONS

Ferbabdez, Joe,. "Robotos Play Football to Test Wireless Network Load Capabilities," ComputerWeekly.com, http://www.computerweekly.com/news/2240113672/Robots-play-football-to-test-wireless-network-load-capabilities (Jan. 11, 2012).

"Intel and Cisco: Collaborative Testing of a Media-Ready WLAN Solution." pp. 1-6 (2011).

Ikuno et al., "System Level Simulation of LTE Networks," In: Vehicular Technology Conference (VTC 2010-Spring). IEEE 71st, pp. 1-5, (May 16-19, 2010).

"Take a Look Inside Intel's State-of-the-Art Mobility Test Facility," Youtube. (https://www.youtube.com/watch?v=8WPBMBz9n7A (May 7, 2009).

France Telecom R&D, "WCDMA-HSDPA System Level Simulator Calibration," R1-040499. 3GPP TSG-RAN-1 Metting #37, Montreal, Canada, pp. 1-8 (May 10-14, 2004).

Commonly-assigned, co-pending U.S. Appl. No. 14/549,520 for "Systems, Methods, and Computer Readable Media for Utilizing a Plurality of Unmanned Aerial Vehicles to Conduct Performance Testing in a Wireless Communications Network." (Unpublished, filed Nov. 20, 2014).

"Intel and Cisco: Collaborative Testing of a Media-Ready WLAN Solution," pp. 1-6 (2011).

* cited by examiner

SYSTEMS, METHODS, AND COMPUTER READABLE MEDIA FOR UTILIZING A MOBILE ROBOTIC PLATFORM TO CONDUCT FUNCTIONALITY TESTING IN A WIRELESS COMMUNICATIONS NETWORK

PRIORITY CLAIM

This application claims the benefit of U.S. Provisional Patent Application Ser. No. 61/900,969, filed Nov. 6, 2013; the disclosure of which is incorporated herein by reference in its entirety.

TECHNICAL FIELD

The subject matter described herein relates to methods and devices used for testing access points in wireless networks. More particularly, the subject matter described herein relates to systems, methods, and computer readable media for utilizing a mobile robotic platform to conduct functionality testing in a wireless communications network.

BACKGROUND

In the deployment and maintenance of wireless communications networks, it is necessary for performance measurements to be taken at multiple locations in the service coverage area to ensure that all elements contributing toward the achieving of a desired performance are functioning properly. This activity is referred to in the industry as a "site survey" and typically results in a report that indicates a level of performance with respect to defined geographical location. As wireless communications networks have evolved to support several hundred megabits of data per second, these networks are becoming more vital to the daily operation of businesses, educational institutions, health care facilities, and public gathering venues. Thus, frequent and reliable testing of the functionality of these wireless communications networks becomes significantly important.

Challenges associated with performing a site survey include manpower and time considerations that are necessary to perform a thorough survey. Existing site survey tools presently require a test administrator to walk the site location (e.g., access point service coverage area) to be surveyed. However, such a procedure may consume a considerable amount of time in order to achieve a comprehensive site survey. In addition, subsequent assessments of the entire site location may be frequently required in order to conduct performance monitoring over a period of time or to inspect the network after a modification is performed in the network, such as a firmware upgrade, a configuration change, a hardware component replacement, or the like.

Accordingly, there exists a need for systems, methods, and computer readable media for utilizing a mobile robotic platform to conduct functionality testing in a wireless communications network.

SUMMARY

Systems, methods, and computer readable media for utilizing a mobile robotic platform to conduct functionality testing in a wireless communications network are disclosed. According to one aspect, the subject matter described herein includes a system that includes a mobile robotic platform configured to navigate within a service coverage area associated with a wireless access point belonging to a wireless communications network, wherein the mobile robotic platform includes a client device emulation module configured to emulate multiple client devices that are wirelessly connected to the wireless access point via multiple wireless connections, to generate emulated test traffic data for each of the emulated client devices, and to send the emulated test traffic data to the wireless access point from each of the emulated client devices via the multiple wireless connections. The mobile robotic platform also comprises at least one real client device that includes a client application configured to establish a wireless connection with the wireless access point and to communicate simulated test traffic data to the wireless access point via the established wireless connection. The mobile robotic platform further includes a performance metrics module configured to determine performance metrics associated with traffic data being wirelessly communicated between the wireless access point and at least one of the emulated client devices or the at least one real client device.

The subject matter described herein may be implemented in hardware, software, firmware, or any combination thereof. As such, the terms "function", "node" or "module" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to systems, methods, and computer readable media for utilizing a mobile robotic platform to conduct functionality testing in a wireless communications network. Reference will now be made in detail to exemplary embodiments of the presently disclosed subject matter, examples of which are illustrated in the accompanying drawings. Wherever possible, the same reference numbers will be used throughout the drawings to refer to the same or like parts. Various embodiments of the present subject matter are disclosed and described herein.

Figure 1:
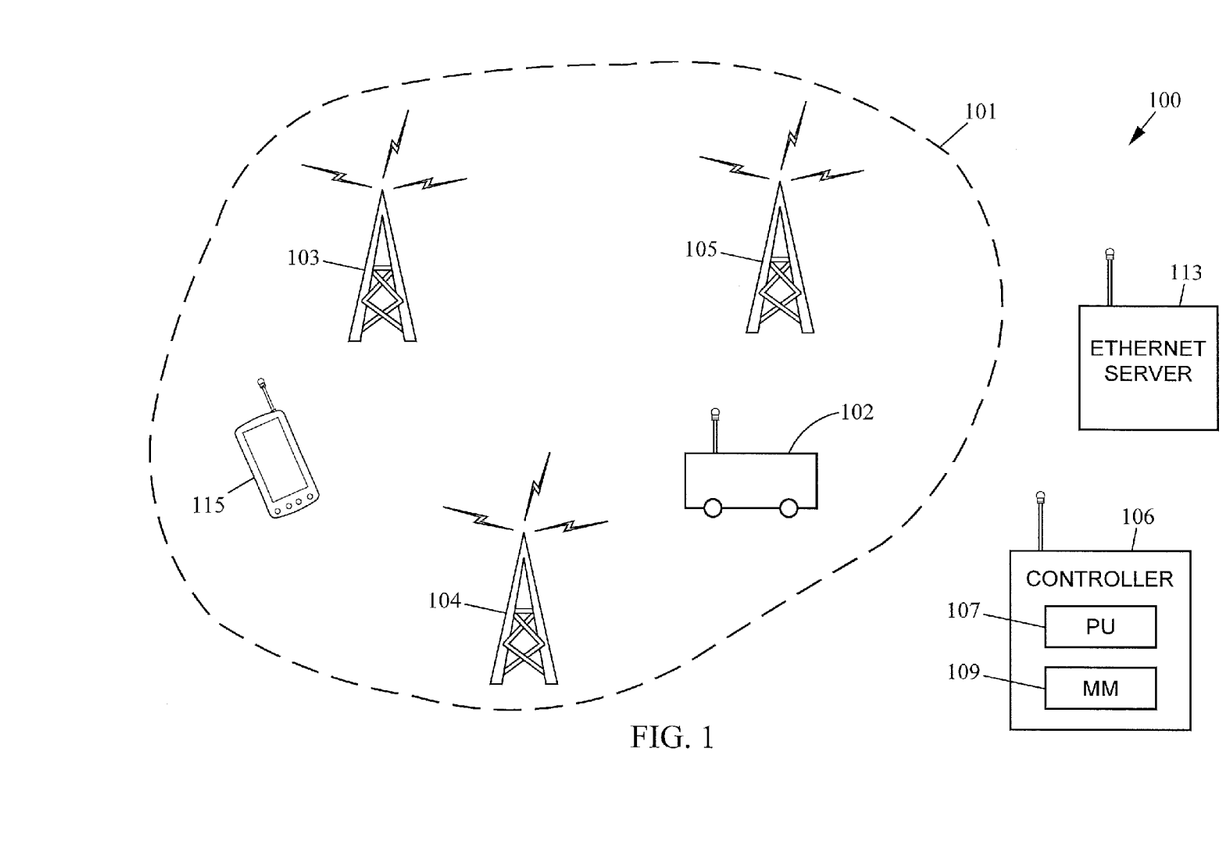
FIG. 1 is a block diagram illustrating an exemplary wireless communications network that includes access points under test according to an embodiment of the subject matter described herein.

FIG. 1 is a block diagram illustrating a test system 100 that includes a mobile robotic platform 102 used for testing the load and functionality capabilities of wireless access points 103-105 located in a service coverage area 101 of a wireless communications network. In some embodiments, each of wireless access points 103-105 may include an access point element or unit, such as an eNodeB, a NodeB, a Wi-Fi access point, a base transceiver station (BTS), or the like. Similarly, service coverage area 101 may represent the geographical area in which access points 103-105 are able to establish a wireless communication link with mobile devices, such as mobile device 115. Although only three access points are depicted in FIG. 1, additional wireless access points may be utilized without departing from the scope of the disclosed subject matter.

In FIG. 1, mobile device 115 may include any mobile device configured to establish a wireless connection with one or more of access points 103-105 via wireless communications (e.g., via Wi-Fi, 3G, LTE, etc.). In some embodiments, mobile device 115 may include a cellular phone, a mobile smartphone, a tablet computer (e.g., an iPad), a personal digital assistant (PDA), a laptop computer, or any other mobile computing device equipped with wireless communication capabilities. In some embodiments, mobile device 115 may be transported by mobile robotic device 102 (e.g., see real client device 112 in FIG. 2).

System 100 also includes a mobile robotic platform 102 that may be configured to traverse service coverage area 101. In some embodiments, mobile robotic platform 102 may comprise a mobile platform device (e.g., a unit equipped with wheels, treads, propeller, etc.) that is configured to navigate within a network under test and apply a test traffic load (e.g., test packet traffic, application traffic, etc.) to one or more of wireless access points 103-105. Notably, mobile robotic platform 102 may be configured to emulate a plurality of emulated client devices (e.g., emulated virtual client devices) that sends simulated test traffic data to access points 103-105. Additional information regarding the functionality and internal components of mobile robotic platform 102 is provided in the description of FIG. 2 below. Although FIG. 1 depicts mobile robotic platform 102 as a terrestrial vehicle, mobile robotic platform 102 may also be embodied as an aircraft, hovercraft, or watercraft.

System 100 also includes a controller unit 106. In some embodiments, controller unit 106 may include any computer device (e.g., a personal computer, a laptop computer, a control panel, etc.) that enables a test administrator or a network operator to manage the navigation and load testing functionality of mobile robotic platform 102. In some embodiments, controller unit 106 can include a processing unit 107 and a management module 109. In some embodiments, processing unit 107 may include a microprocessor, central processing unit (CPU), or any other like hardware based processor unit that is configured to execute and/or utilize management module 109 (e.g., a software based algorithm, such as an Ixia WaveDeploy application) to apply a test load to a wireless access point and to analyze performance metrics received from mobile robotic platform 102. Management module 109 may be stored in memory of controller 106 (not shown), such as random access memory (RAM), read only memory (ROM), optical read/write memory, cache memory, magnetic read/write memory, flash memory, or any other non-transitory storage media. In one embodiment, processing unit 107 and memory may be used to execute and manage the operation of management client module 109.

System 100 may also include an Ethernet server 113 that may be configured to be communicatively connected with at least one of mobile robotic platform 102 and access points 103-105. In some embodiments, a test administrator may configure mobile robotic platform 102 to direct test traffic to Ethernet server 113 via a tested access point 105. In such a configuration, the test administrator can tap or monitor the test traffic data handled by access point 105. Notably, the test administrator may inspect various performance metrics that indicate the performance of access point 105 in the monitored test traffic data. Thus, no data is requested directly from the access point. In some embodiments, performance metrics are determined based on the results obtained by mobile robotic platform 102, Ethernet server 113, and real client devices present in system 100 (e.g., laptops, iPhones, iPads, tablet computers, etc.).

Figure 2:
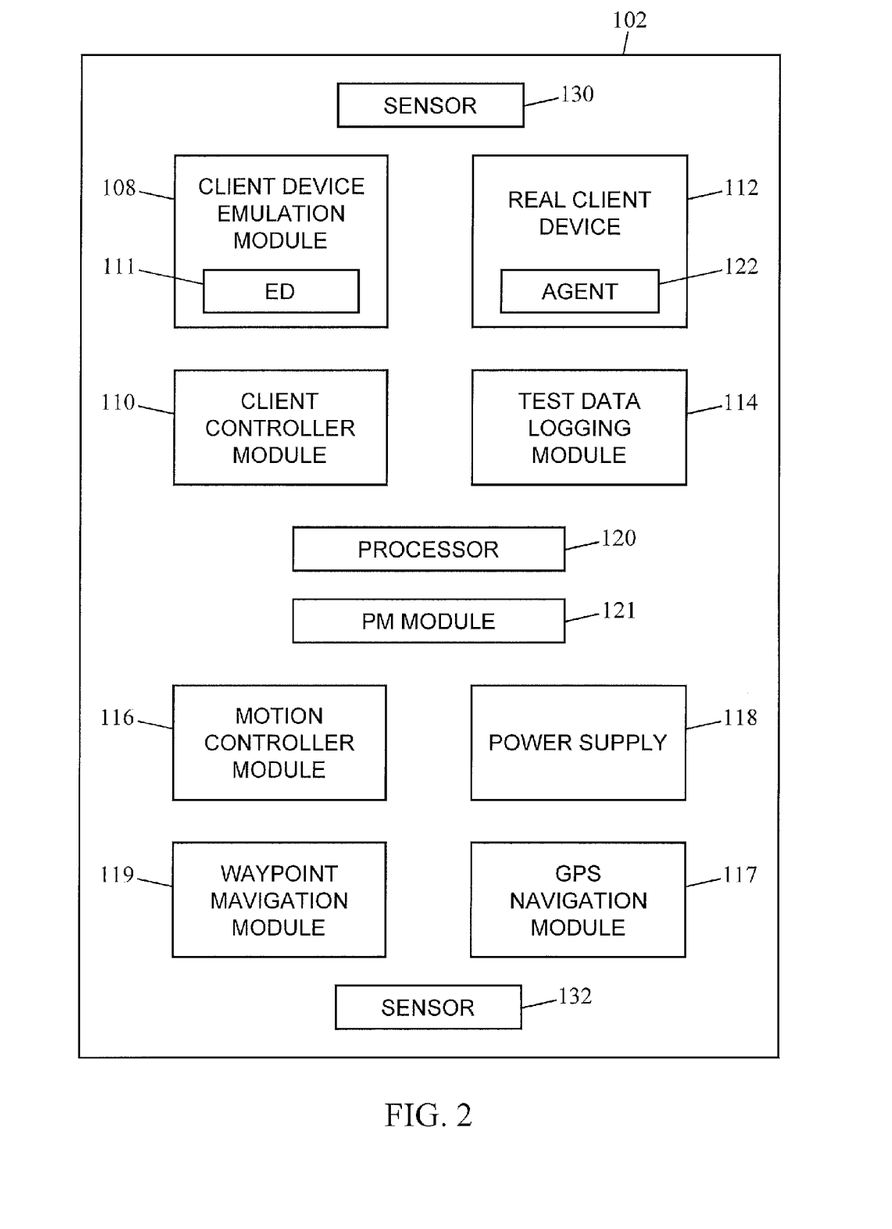
FIG. 2 is a block diagram illustrating an exemplary mobile robotic platform configured to conduct functionality testing in a wireless communications network according to an embodiment of the subject matter described herein.

FIG. 2 is a block diagram illustrating the components of an exemplary mobile robotic platform 102 configured to conduct wireless access point testing according to an embodiment of the subject matter described herein. In some embodiments, mobile robotic platform 102 may be configured include a client device emulation module 108. Client device emulation module 108 may include hardware in combination with software and/or firmware that is adapted to emulate multiple client devices with wireless capabilities. Exemplary wireless clients include smartphones, laptop computers, tablet computers, iPads, and the like. Client device emulation module 108 may be configured to enable each of a plurality of emulated client devices to establish a wireless connection with a wireless access point. For example, the wireless connection may be a radio frequency (RF) connection to a cellular access point associated with a long term evolution (LTE) network under test or an over-the-air (OTA) connection to a Wi-Fi access point associated with a Wi-Fi network under test. In one scenario, client device emulation module 108 may be configured to emulate 50 iPad devices which are adapted to respectively establish 50 Wi-Fi air-interface connections with a Wi-Fi access point. The Wi-Fi air-interface connections established with the Wi-Fi access point enables the emulated client devices to send Internet protocol (IP) traffic to the serving Wi-Fi access point. Similarly, the Wi-Fi air-interface connections established with the Wi-Fi access point enables the emulated client devices to receive IP traffic from the serving Wi-Fi access point.

In some embodiments, client controller module 110 is configured to administer and control the operation of each of the emulated client devices 111. Client controller module 110 may also include or have access to test traffic data that is generated by each of the emulated client devices during the course of a functionality or load test. As such, client controller module 110 may be used to facilitate the aggregate load testing of one or more of wireless access points 103-105 that are connected to multiple emulated client devices.

In some embodiments, mobile robotic platform 102 may be configured to include one or more real client devices 112. Real client device 112 may include a physical (e.g., not emulated) mobile cellphone, mobile smartphone (e.g., iPhone), tablet computer (iPad), laptop computer, or the like. In some embodiments, real client device 112 may include a software test agent 122 that is provisioned on real client device 112 prior to test execution. Software test agent 122 (e.g., Ixia WaveAgent application) may be configured to execute a traffic load test, which may involve the sending or receiving of test traffic data after real client device 112 has connected to the access point to be tested. Exemplary traffic data may include simulated traffic data that is generated by a media streaming simulator that is executed by software test agent 122. In some embodiments, software test agent 122 may generate statistics based on collected performance metrics associated with the load test. Software test agent 122 may also manage and report the generated statistics to test data logging module 114. In some embodiments, test data logging module 114 may be configured to receive and maintain log information provided by emulated client module 108 and real client device 112. For example, test data logging module 114 may keep track of information related to the test traffic data sent from each emulated client device and each real client device, such as amount of traffic sent (e.g., packet throughput), packet loss statistics, signal strength measurements, retransmission statistics, throughput latency, and the like.

Mobile robotic platform 102 may include a processing unit 120. In some embodiments, processing unit 120 may include a microprocessor, central processing unit (CPU), or any other like hardware based processor unit that is configured to execute and/or utilize the modules in mobile robotic platform 102.

Mobile robotic platform 102 may also include a performance metrics module 121. Performance metrics module 121 may be configured to process traffic data communicated between an access point under test and at least one of client device emulation module 108 (e.g., multiple emulated client devices) and real client device(s) 112. Specifically, performance metrics module 121 may obtain performance metrics from the processed traffic data. Performance metrics module 121 may also be configured to utilize the performance metrics to measure the performance of the access point under test or real client device(s) 112 under loaded conditions. In an alternate embodiment, performance metrics module 121 may be configured to forward the performance metrics to management module 109 in controller 106 for measurement processing.

In some embodiments, mobile robotic platform 102 may be autonomous from the perspective of movement within the service coverage area (e.g., area 101) of the network under test. Mobile robotic platform 102 may include a motion controller module 116 (e.g., a spatial movement controller module) that comprises software and data structures configured to enable mobile robotic platform 102 to move and generally navigate under its own power within the coverage area of the network under test without any real-time communication from an external human operator. In some embodiments, motion controller module 116 may have access to a GPS transceiver, a camera, and/or pre-programmed route data or instructions (e.g., a floor layout plan and defined path/route). In some embodiments, motion controller module 116 may have access to one or more onboard proximity sensors that are configured to detect the presence of obstacles. Notably, motion controller module 116 may be configured to use sensors 130-132 to implement navigation controls sufficient to automatically and/or autonomously avoid potential obstacles. Sensors 130-132 may also be configured to detect locating beacons emitted from waypoint devices (e.g., see FIG. 3). Although only two sensors are depicted in FIG. 2, additional sensors may be utilized by mobile robotic platform 102 without departing from the scope of the disclosed subject matter.

In an alternate embodiment, mobile robotic platform 102 may be navigated in a non-autonomous or semi-autonomous manner from the perspective of movement within the service coverage area of the network under test. In this scenario, motion controller module 116 (e.g., a spatial movement controller module) includes software and data structures sufficient to enable mobile robotic platform 102 to move and generally navigate under its own power within the service coverage area of the network under test with some real-time communications and/or instructions provided from a remotely located human operator.

In some embodiments, mobile robotic platform 102 may be powered by an onboard power supply unit 118, such as one or more onboard batteries. Power from the onboard power supply unit 118 may be used to provide electricity to onboard motors that provide platform locomotion (e.g., via wheels, treads, legs, propeller, etc.). Power supply unit 118 may also be used to power onboard electrical systems on mobile robotic platform 102, such as computer systems, communication systems and sensor arrays.

In some embodiments, mobile robotic platform 102 may include a global positioning system (GPS) navigation module 117 that is configured for receiving GPS signals from satellites (e.g., using a GPS transceiver). Data contained in the GPS signal may be utilized by GPS navigation module 117 to calculate the position, speed, and heading of mobile robotic platform 102. In some embodiments, a plurality of GPS coordinates that represents a desired path may be provided to GPS navigation module 117 by a test administrator. In an alternate embodiment, motion controller module 116 may also be configured with a preprogrammed set of directions that utilizes a set of coordinates that differs from GPS coordinates to navigate mobile robotic platform 102.

In some embodiments, mobile robotic platform 102 may utilize intelligent waypoint devices (i.e., also referred to herein as "waypoints") to maneuver through a test coverage area. Notably, the waypoints are used to emit signals and data that may be used to navigate mobile robotic platform 102 in such a manner that does not require human intervention. For example, mobile robotic platform 102 may include sensors 130 and 132 that are configured to receive and locate the direction of a locating beacon emitted by a waypoint device.

In some embodiments, mobile robotic platform 102 includes a waypoint navigation module 119. Waypoint navigation module 119 may function as a control program that is configured to electronically receive (e.g., import) a floor layout plan of the facility or service coverage area to be subjected to a site assessment. In some embodiments, a test administrator may electronically upload a floor layout plan to waypoint navigation module 119, which then enables the test administrator to indicate the positioning of waypoint devices on the floor layout plan. The test administrator may also use the floor layout plan to assign a unique identifier to each waypoint device.

After establishing the location of the waypoint devices on the floor layout plan, a test administrator may then assign each waypoint device with its own unique identifier and physically position the waypoint devices in the locations of the facility or coverage area that corresponds to the location information entered on the floor layout plan (or vice versa) via waypoint navigation module 119. Once the waypoints are placed, mobile robotic platform 102 may be initiated to navigate/travel to the first waypoint in a predefined manner (e.g., arrive at waypoints in sequence). Waypoint navigation module 119 may also be instructed to start a site assessment sequence. After the site assessment sequence is initiated, waypoint navigation module 119 may be configured to execute a functionality test at a test point, determine the distance from the current waypoint to the next test point, navigate to the next test point, and execute the next measurement at the next test point upon arrival. This process is repeated by mobile robotic platform 102 until the test points are all completed. Notably, once the waypoints are positioned and established on the floor layout plan, waypoint navigation module 119 may be used to execute a site assessment or site survey repeatedly with the same pattern that helps eliminate test point location inconsistencies in subsequent tests.

More specifically, waypoint navigation module 119 may identify the placement of waypoints on the floor layout plan, may determine the identification information for each waypoint on the floor layout plan, and may identify where measurements are to be made at or between waypoints. Waypoint navigation module 119 may be configured to provide movement control information to motion controller module 116. Moreover, waypoint navigation module 119 may be configured to conduct site assessment measurements and configured to index test points taken against the floor layout plan. For example, waypoint navigation module 119 may be used to determine a distance that mobile robotic platform 102 has traversed/traveled from a starting point or a recently visited waypoint device. By being able to measure the distance from a last visited waypoint, mobile robotic platform 102 can be configured to stop at any test point located between two waypoint devices (e.g., using the last known waypoint as a reference point).

Figure 3:
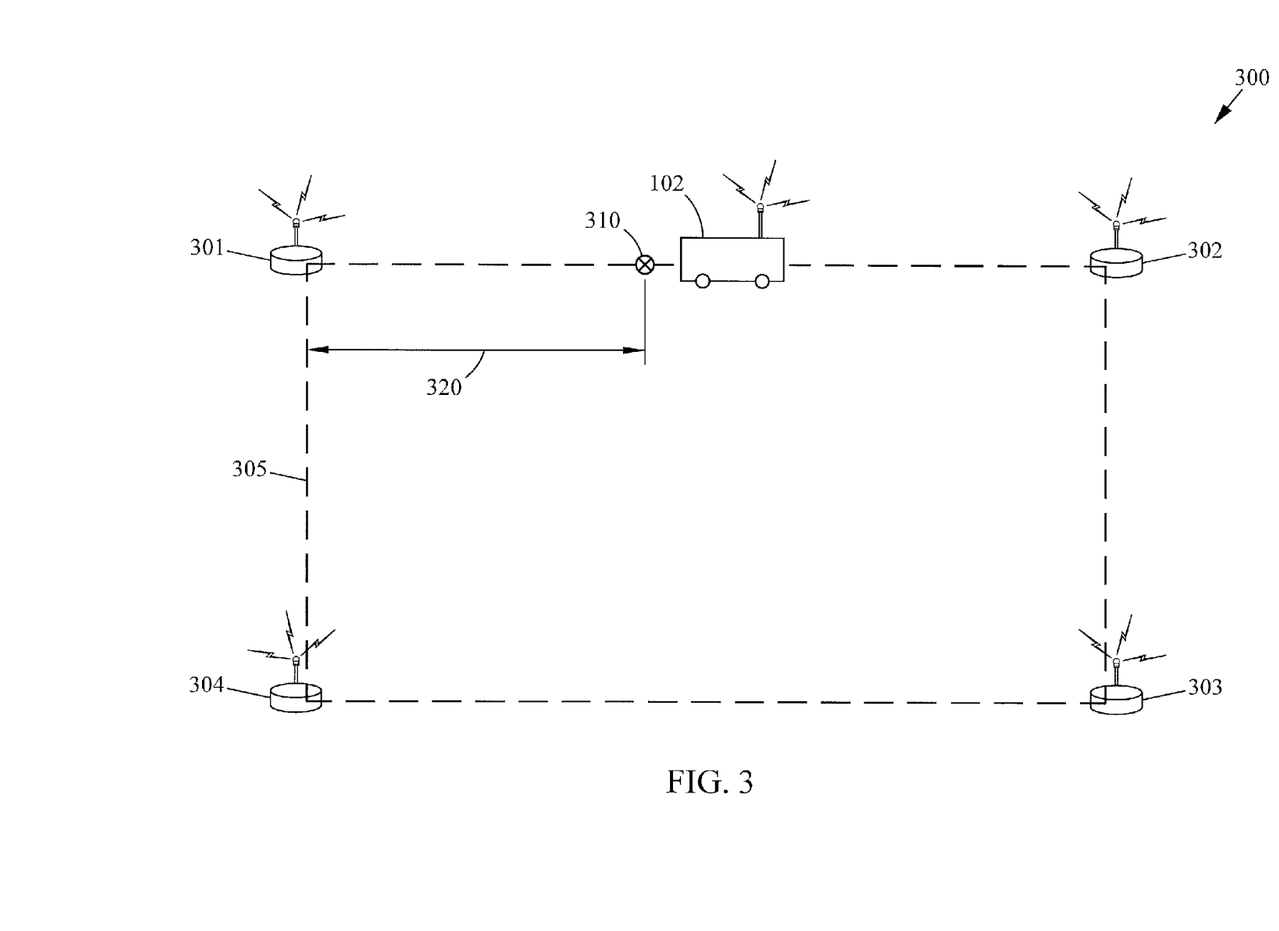
FIG. 3 is a block diagram illustrating the utilization of waypoint devices to navigate a mobile robotic platform according to an embodiment of the subject matter described herein.

FIG. 3 depicts an exemplary system that is configured to utilize a plurality of waypoints to navigate a mobile robotic platform in a service coverage area. For example, system 300 may include a plurality of waypoint devices 301-304 that are configured to navigate a mobile robotic platform 102 along a specified path 305. In some embodiments, each of waypoint devices 301-304 may include a battery-operated device that is configured to emit a locating beacon and identification information (i.e., data that identifies the particular emitting waypoint device). For example, the identification information may include a unique identifier, such as an integer number or alphanumeric identifier. The unique identifier may be used to denote a waypoint device's order placement (e.g., waypoint A, waypoint B, waypoint C, etc.) in a site assessment sequence. By utilizing waypoints, path 305 traversed mobile robotic platform 102 may be defined (e.g., via the number and the facility/coverage area constraints). In the example shown in FIG. 3, if mobile robotic platform 102 is expected to navigate a path 305 resembling a rectangular pattern, waypoint devices 301-304 may be positioned at the four corners of the rectangle. By receiving beacon energy (e.g., a beacon signal) emitted from a waypoint device, mobile robotic platform 102 may orient towards and subsequently navigate to the transmitting waypoint device. Similarly, mobile robotic platform 102 may use identification information from a waypoint device to determine (or confirm) that mobile robotic platform 102 is proceeding towards the correct waypoint.

As indicated above, mobile robotic platform 102 may include sensors that are configured to receive and locate the direction of a locating beacon emitted by a waypoint device. Mobile robotic platform 102 may also be provisioned with a waypoint navigation module (e.g., module 119 in FIG. 2) that may be used to measure a distance that mobile robotic platform 102 has traveled from a designated starting point or a recently visited waypoint device. By determining the distance of mobile robotic platform 102 from the last waypoint device, mobile robotic platform 102 can be configured to test an access point at any test point located between two waypoints (e.g., using the last known waypoint device as a reference point). For example, in FIG. 3 mobile robotic platform 102 is traversing a path 305 and is presently traveling from waypoint device 301 to waypoint device 302. Waypoint navigation module 119 in mobile robotic platform 102 may be configured to record the positioning (e.g., using GPS or a coordinate system associated with a designated floor layout plan loaded in mobile robotic platform 102) of waypoint device 301. After detecting the locating beacon from waypoint device 302, mobile robotic platform 102 proceeds along path 305 from waypoint device 301 until a predefined test point 310 is reached. More specifically, mobile robotic platform 102 proceeds until a particular predefined (e.g., preprogrammed) distance 320 is traversed on path 305. Once mobile robotic platform 102 traverses distance 320 and arrives at test point 310, mobile robotic platform 102 may be configured to stop and conduct a network functionality test at the test point 310. Thus, by utilizing i) a known position/location of at least one of waypoint device 301-304 and ii) the distance traveled along a defined path 305, mobile robotic platform 102 may be autonomously navigated to any point on path 305 and subsequently be prompted to conduct a wireless network functionality test.

In some embodiments, waypoint navigation module in mobile robotic platform 102 may function as a control program that is configured to electronically import a floor layout plan of the facility or coverage area to be tested. Using the floor layout plan data, mobile robotic platform 102 may identify the placement of waypoint device 301-304 on the floor layout plan, may determine the identification information for each waypoint on the floor layout plan, and may identify where measurements are to be made at or between waypoints. The waypoint navigation module may be configured to provide movement control information to a motion controller module. Moreover, the waypoint navigation module may be configured to conduct site assessment measurements and configured to index survey points taken against the floor layout plan.

Figure 4:
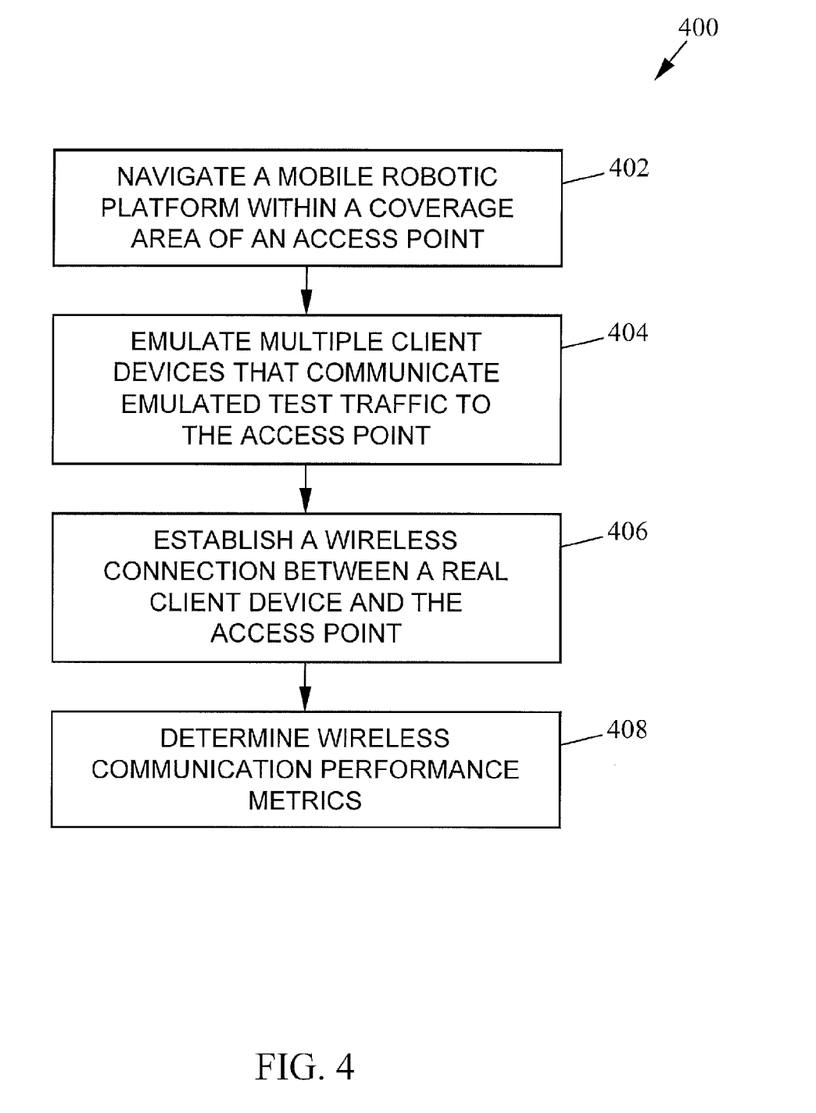
FIG. 4 is a flow chart illustrating an exemplary process for utilizing a mobile robotic platform to conduct functionality testing in a wireless communications network according to an embodiment of the subject matter described herein.

FIG. 4 is a flow chart illustrating an exemplary method 400 for utilizing a mobile robotic platform to conduct functionality testing in a wireless communications network according to an embodiment of the subject matter described herein. In step 402, a mobile robotic platform is navigated within a service coverage area of an access point. In some embodiments, a mobile robotic platform is navigated in a service coverage area via GPS or some other alternative coordinate positioning system. For example, mobile robotic platform 102 may be provisioned with a floor layout plan and an associated preprogrammed route that is defined by GPS coordinates (or other coordinates). Similarly, the floor layout plan may also include test points that are defined by GPS coordinates.

In step 404, multiple client devices that communicate test traffic data to an access point are emulated. In some embodiments, the mobile robotic platform is configured to emulate a plurality of client devices in such a manner that the mobile robotic platform simulates test traffic from each of the plurality of emulated client devices. The simulated test traffic is then directed towards a wireless access point under test.

In step 406, a wireless connection between a real client device and the access point is established. In some embodiments, the mobile robotic platform includes at least one real client device (e.g., a mobile smartphone) that includes an agent application configured to establish a wireless connection between the wireless access point under test and the real client device. The agent application is also configured to communicate simulated test traffic data to the access point under test via the wireless connection.

In step 408, wireless communication performance metrics are determined. In some embodiments, the mobile robotic platform includes a performance metrics module that is configured to determine wireless communication performance metrics associated with the wireless connection between i) the wireless access point and the emulated client devices, ii)

the wireless access point and the real client device(s), or iii) the wireless access point with both the emulated client devices and the real client device(s).

What is claimed is:

1. A system for testing a wireless access point associated with a wireless communications network, the system comprising:
   a mobile robotic platform configured to navigate within a service coverage area associated with a wireless access point belonging to a wireless communications network, wherein the mobile robotic platform includes:
      a client device emulation module configured to emulate multiple client devices that are wirelessly connected to the wireless access point via multiple wireless connections, to generate emulated test traffic data for each of the emulated client devices, and to send the emulated test traffic data to the wireless access point from each of the emulated client devices via the multiple wireless connections;
      at least one real client device that includes a client application configured to establish a wireless connection with the wireless access point and to communicate simulated test traffic data to the wireless access point via the established wireless connection; and
      a performance metrics module configured to determine performance metrics associated with traffic data being wirelessly communicated between the wireless access point and at least one of the emulated client devices or the at least one real client device.

2. The system of claim 1 wherein the mobile robotic platform is configured to navigate with the service coverage area by using waypoint devices.

3. The system of claim 2 wherein the mobile robotic platform utilizes locating beacon signals and identification information emitted from the waypoint devices to navigate the service coverage area.

4. The system of claim 3 wherein the mobile robotic platform generates the emulated test traffic data for each of the emulated client devices at a test point in the service coverage area, wherein the test point is determined using a measured distance from at least one of the waypoint point devices.

5. The system of claim 1 wherein the mobile robotic platform is configured to navigate with the service coverage area using global positioning system (GPS) coordinates.

6. The system of claim 1 wherein the mobile robotic platform includes a battery power source.

7. The system of claim 1 wherein the emulated test traffic data sent to the wireless access point is configured to apply a loaded condition at the wireless access point.

8. The system of claim 1 wherein the mobile robotic platform is remotely controlled by a human operator.

9. The system of claim 1 wherein the mobile robotic platform is navigated autonomously via onboard proximity sensors.

10. The system of claim 1 wherein each of the multiple wireless connections between the emulated client devices and the wireless access point includes a Wi-Fi connection, a radio frequency (RF) connection, a long term evolution (LTE) connection, or a 3G connection.

11. The system of claim 1 wherein the wireless connection between the at least one real client device and the wireless access point includes a Wi-Fi connection, a radio frequency (RF) connection, a long term evolution (LTE) connection, or a 3G connection.

12. The system of claim 1 wherein the mobile robotic platform includes a terrestrial vehicle, an aircraft, a hovercraft, or a watercraft.

13. A method for testing a wireless access point associated with a wireless communications network, the method comprising:
   navigating, by a mobile robotic platform, within a service coverage area associated with a wireless access point belonging to a wireless communications network;
   emulating, by the mobile robotic platform, multiple client devices that are wirelessly connected to the wireless access point via multiple wireless connections, wherein the emulated client devices generate emulated test traffic that is communicated to the wireless access point via the multiple wireless connections;
   establishing, by at least one real client device on the mobile robotic platform, a wireless connection with the wireless access point;
   communicating simulated test traffic data generated by the real client device to the wireless access point via the established connection; and
   determining performance metrics associated with traffic data being wirelessly communicated between the wireless access point and at least one of the emulated client devices or the at least one real client device.

14. The method of claim 13 wherein the mobile robotic platform is configured to navigate with the service coverage area by using waypoint devices.

15. The method of claim 14 wherein the mobile robotic platform utilizes locating beacon signals and identification information emitted from the waypoint devices to navigate the service coverage area.

16. The method of claim 15 wherein the mobile robotic platform generates the emulated test traffic data for each of the emulated client devices at a test point in the service coverage area, wherein the test point is determined using a measured distance from at least one of the waypoint point devices.

17. The method of claim 13 wherein the mobile robotic platform is configured to navigate with the service coverage area using global positioning system (GPS) coordinates.

18. The method of claim 13 wherein the mobile robotic platform includes a battery power source.

19. The method of claim 13 wherein the emulated test traffic data sent to the wireless access point is configured to apply a loaded condition at the wireless access point.

20. The method of claim 13 wherein the mobile robotic platform is remotely controlled by a human operator.

21. The method of claim 13 wherein the mobile robotic platform is navigated autonomously via onboard proximity sensors.

22. The method of claim 13 wherein each of the multiple wireless connections between the emulated client devices and the wireless access point includes a Wi-Fi connection, a radio frequency (RF) connection, a long term evolution (LTE) connection, or a 3G connection.

23. The method of claim 13 wherein the wireless connection between the at least one real client device and the wireless access point includes a Wi-Fi connection, a radio frequency (RF) connection, a long term evolution (LTE) connection, or a 3G connection.

24. The method of claim 13 wherein the mobile robotic platform includes a terrestrial vehicle, an aircraft, a hovercraft, or a watercraft.

25. A non-transitory computer readable medium having stored thereon executable instructions that when executed by the processor of a computer control the computer to perform steps comprising:

navigating, by a mobile robotic platform, within a service coverage area associated with a wireless access point belonging to a wireless communications network;

emulating, by the mobile robotic platform, multiple client devices that are wirelessly connected to the wireless access point via multiple wireless connections, wherein the emulated client devices generate emulated test traffic that is communicated to the wireless access point via the multiple wireless connections;

establishing, by at least one real client device on the mobile robotic platform, a wireless connection with the wireless access point;

communicating simulated test traffic data generated by the real client device to the wireless access point via the established connection; and determining performance metrics associated with traffic data being wirelessly communicated between the wireless access point and at least one of the emulated client devices or the at least one real client device.

* * * * *